(12) United States Patent
Chen et al.

(10) Patent No.: US 12,008,459 B2
(45) Date of Patent: Jun. 11, 2024

(54) MULTI-TASK MACHINE LEARNING ARCHITECTURES AND TRAINING PROCEDURES

(71) Applicant: Microsoft Technology Licensing, LLC, Redmond, WA (US)

(72) Inventors: Weizhu Chen, Kirkland, WA (US); Pengcheng He, Sammamish, WA (US); Xiaodong Liu, Bellevue, WA (US); Jianfeng Gao, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1025 days.

(21) Appl. No.: 16/443,440

(22) Filed: Jun. 17, 2019

(65) Prior Publication Data
US 2020/0334520 A1   Oct. 22, 2020

Related U.S. Application Data
(60) Provisional application No. 62/836,542, filed on Apr. 19, 2019.

(51) Int. Cl.
*G06N 3/088* (2023.01)
*G06F 40/20* (2020.01)
*G06N 3/045* (2023.01)
*G06N 3/047* (2023.01)

(52) U.S. Cl.
CPC ............. *G06N 3/047* (2023.01); *G06F 40/20* (2020.01); *G06N 3/045* (2023.01); *G06N 3/088* (2013.01)

(58) Field of Classification Search
CPC .... G06N 3/0472; G06N 3/0454; G06N 3/088; G06F 40/20
See application file for complete search history.

(56) References Cited

U.S. PATENT DOCUMENTS

| | | | |
|---|---|---|---|
| 2014/0257805 A1* | 9/2014 | Huang | G06N 3/084 704/232 |
| 2017/0032035 A1* | 2/2017 | Gao | G06F 16/3347 |
| 2019/0258714 A1* | 8/2019 | Zhong | G06N 3/084 |
| 2019/0325308 A1* | 10/2019 | Chung | G06N 3/08 |

(Continued)

FOREIGN PATENT DOCUMENTS

EP    3144859 A2    3/2017

OTHER PUBLICATIONS

Waters, Austin, Meysam Bastani, Mohamed G. Elfeky, Pedro Moreno, and Xavier Velez. "Towards acoustic model unification across dialects." (2016). (Year: 2016).*

(Continued)

*Primary Examiner* — Oluwatosin Alabi
(74) *Attorney, Agent, or Firm* — Rainier Patents, P.S.

(57) ABSTRACT

This document relates to architectures and training procedures for multi-task machine learning models, such as neural networks. One example method involves providing a multi-task machine learning model having one or more shared layers and two or more task-specific layers. The method can also involve performing a pretraining stage on the one or more shared layers using one or more unsupervised prediction tasks. The method can also involve performing a tuning stage on the one or more shared layers and the two or more task-specific layers using respective task-specific objectives.

20 Claims, 12 Drawing Sheets

(56) References Cited

U.S. PATENT DOCUMENTS

2020/0311341 A1* 10/2020 Chaturvedi ............ G06N 20/00

OTHER PUBLICATIONS

Wehrmann, Joônatas, Willian E. Becker, and Rodrigo C. Barros. "A Multi-Task Neural Network for Multilingual Sentiment Classification and Language Detection on Twitter." Machine translation 2, No. 32 (2018): 37. (Year: 2018).*

Hashimoto K, Xiong C, Tsuruoka Y, Socher R. A joint many-task model: Growing a neural network for multiple nlp tasks. arXiv preprint arXiv: 1611.01587. Nov. 5, 2016. (Year: 2016).*

Dong, D., Wu, H., He, W., Yu, D. and Wang, H., Jul. 2015. Multi-task learning for multiple language translation. In Proceedings of the 53rd Annual Meeting of the Association for Computational Linguistics and the 7th International Joint Conference on NPL (vol. 1: Long Papers) (Year: 2015).*

Ye J, Wang X, Ji Y, Ou K, Song M. Amalgamating filtered knowledge: Learning task-customized student from multi-task teachers. arXiv preprint arXiv: 1905.11569. May 28, 2019. (Year: 2019).*

Liu X, He P, Chen W, Gao J. Improving multi-task deep neural networks via knowledge distillation for natural language understanding. arXiv preprint arXiv: 1904.09482. Apr. 20, 2019. (Year: 2019).*

Mukherjee S, Awadallah AH. Distilling bert into simple neural networks with unlabeled transfer data. arXiv preprint arXiv: 1910.01769. Oct. 4, 2019. (Year: 2019).*

"International Search Report and Written Opinion Issued in PCT Application No. PCT/US20/023040", dated Jun. 18, 2020, 11 Pages.

Yin, et al., "Knowledge transfer for deep reinforcement learning with hierarchical experience replay", Retrieved From: https://www.aaai.org/Conferences/AAAI/2017/PreliminaryPapers/11-YinH-14478.pdf, Feb. 13, 2017, 7 Pages.

Ba, et al., "Layer Normalization", In Repository of arXiv:1607.06450, Jul. 21, 2016, 14 Pages.

Bowman, et al., "A large annotated corpus for learning natural language inference", In Proceedings of Conference on Empirical Methods in Natural Language Processing, Sep. 2015, 11 Pages.

Bucilua, et al., "Model Compression", In Proceedings of the 12th ACM SIGKDD International Conference on Knowledge Discovery and Data Mining, Aug. 20, 2006, 7 Pages.

Burges, et al., "Learning to Rank Using Gradient Descent", In Proceedings of the 22nd International Conference on Machine Learning, Aug. 7, 2005, pp. 89-96.

Caruana, Rich, "Multitask learning", In Journal of Machine learning vol. 28, No. 1, Jul. 1, 1997, pp. 41-75.

Chen, et al., "Net2net: Accelerating Learning via Knowledge Transfer", In Journal of the Computing Research Repository, Nov. 2015, pp. 1-10.

Collobert, et al., "Natural Language Processing (Almost) from Scratch", In the Journal of Machine Learning Research, vol. 12, Aug. 2011, pp. 2493-2537.

Devlin, et al., "BERT: Pre-training of Deep Bidirectional Transformers for Language Understanding", In Repository of arXiv:1810.04805, Oct. 11, 2018, pp. 4171-4186.

Dong, Li, et al., "Unified language model pre-training for natural language understanding and generation", In Repository of arXiv: 1905.03197, May 8, 2019, 13 Pages.

Gao, et al., "Neural approaches to conversational AI", Published in Foundations and Trends in Information Retrieval 13, No. 2-3 (2019), 2019, 64 Pages.

Glockner, et al., "Breaking nli systems with sentences that require simple lexical inferences", In Proceedings of the 56th Annual Meeting of the Association for Computational Linguistics(ACL), 2018, pp. 650-655.

Guo, et al., "Soft layer-specific multi-task summarization with entailment and question generation", In Proceedings of the 56th Annual Meeting of the Association for Computational Linguistics (vol. 1: Long Papers), Jul. 15, 2018, pp. 687-697.

Hancock, et al., "Massive multi-task learning with snorkel metal: Bringing more supervision to bear", Retrieved From: https://dawn.cs.stanford.edu/2019/03/22/glue/, Mar. 22, 2019, 9 Pages.

Hinton, et al., "Distilling the knowledge in a neural network", In Journal of Computing Research Repository, Mar. 2015, pp. 1-9.

Huang, et al., "Fusionnet: Fusing via fullyaware attention with application to machine comprehension", In Repository of arXiv:1711.07341, Nov. 16, 2017, 20 Pages.

Huang, et al., "Learning Deep Structured Semantic Models for Web Search Using Clickthrough Data", In the Proceedings of the 22nd ACM International Conference on Information & Knowledge Management, Oct. 27, 2013, pp. 2333-2338.

Khot, et al., "SciTail: A textual entailment dataset from science question answering", In Proceedings of the Thirty-Second AAAI Conference on Artificial Intelligence, (AAAI-18), Feb. 2, 2018, 9 Pages.

Kim, et al., "Semantic Sentence Matching with Densely-Connected Recurrent and Co-attentive information", In Repository of arXiv: 1805.11360, Nov. 2, 2018, 11 Pages.

Kingma, et al., "Adam: A method for stochastic optimization", In Publication of arXiv preprint arXiv:1412.6980, Dec. 22, 2014, pp. 1-15.

Korattikara, et al., "Bayesian dark knowledge", In Proceedings of Conference Advances in Neural Information Processing Systems, Dec. 7, 2015, pp. 3438-3446.

Liu, et al., "Improving Multi-Task Deep Neural Networks via Knowledge Distillation for Natural Language Understanding", In Repository of arXiv:1904.09482, 2019, 8 Pages.

Liu, et al., "Multi-Task Deep Neural Networks for Natural Language Understanding", In Repository of arXiv:1901.11504, 2019, 10 Pages.

Liu, et al., "Representation Learning using Multi-Task Deep Neural Networks for Semantic Classification and Information Retrieval", In the proceedings of the Conference of the North American Chapter of the Association for Computational Linguistics: Human Language Technologies, May 31, 2015, 10 Pages.

Liu, et al., "Stochastic answer networks for machine reading comprehension", In Proceedings of the 56th Annual Meeting of the Association for Computational Linguistics (vol. 1: Long Papers)., 2018, pp. 1694-1704.

Liu, et al., "Stochastic answer networks for natural language inference", In Repository of arXiv:1804.07888, Apr. 21, 2018, 6 pages.

Luong, et al., "Multi-Task Sequence To Sequence Learning", In Proceedings of International Conference on Learning Representations, May 2, 2016, pp. 1-10.

Peters, et al., "Deep Contextualized Word Representations", In Repository of arXiv:1802.05365, Feb. 15, 2018, 15 Pages.

Phang, et al., "Sentence encoders on stilts: Supplementary training on intermediate labeled-data tasks", In Repository of arXiv: 1811.01088, 2018, 12 Pages.

Radford, et al., "Improving Language Understanding by Generative Pre-Training", Retrieved from: https://www.semanticscholar.org/paper/Improving-Language-Understanding-by-Generative-Radford/cd18800a0fe0b668a1cc19f2ec95b5003d0a5035, 2018, 12 Pages.

Rajpurkar, et al., "Squad: 100,000+ questions for machine comprehension of text", In repository of arXiv:1606.05250, 2016, pp. 2383-2392.

Ruder12,et al., "Latent multi-task architecture learning", In Repository of arXiv:1705.08142, 2018, 8 Pages.

Talman, et al., "Testing the generalization power of neural network models across nli benchmarks", In Repository of arXiv:1810.09774, Oct. 2018, 10 Pages.

Tan, et al., "Multilingual neural machine translation with knowledge distillation", In Proceedings of International Conference on Learning Representations, 2019, 15 Pages.

Vaswani, et al., "Attention Is All You Need", In Journal of Computing Research Repository, Jun. 2017, pp. 1-15.

Wang, et al., "Glue: A Multi-Task Benchmark and Analysis Platform for Natural Language Understanding", In Repository of arXiv:1804.07461v2 [cs.CL], Sep. 18, 2018, 13 pages.

(56) References Cited

OTHER PUBLICATIONS

Xu, et al., "Multi-task learning for machine reading comprehension", In Repository of arXiv:1809.06963, Sep. 18, 2018, 13 Pages.
Zhang, Yu, et al., "A survey on multitask learning", In Repository of arXiv:1707.08114, Jul. 25, 2017, 20 Pages.

* cited by examiner

MULTI-TASK MACHINE LEARNING ARCHITECTURES AND TRAINING PROCEDURES

BACKGROUND

One approach to machine learning is to define a model structure that is suited for a particular task, and then train the model structure using labeled training data appropriate for that task. For example, a convolutional neural network can be constructed for detecting faces in images. Then, training images can be labeled by human beings to indicate whether individual images have faces in them, and the labeled training images can be used to train the convolutional neural network.

This approach works reasonably well for training a task-specific machine learning model, provided there is sufficient training data available. However, models obtained in this fashion are inherently task-specific. In addition, there may be a relative lack of available training data for certain tasks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for training and employing multi-task machine learning models. One example includes a method or technique that can be performed on a computing device. The method or technique can include providing a multi-task machine learning model having one or more shared layers and two or more task-specific layers. The method or technique can also include performing a pretraining stage on the one or more shared layers using one or more unsupervised prediction tasks. The method or technique can also include performing a tuning stage on the one or more shared layers and the two or more task-specific layers using respective task-specific objectives Another example includes a system having a hardware processing unit and a storage resource storing computer-readable instructions. When executed by the hardware processing unit, the computer-readable instructions can cause the hardware processing unit to provide a multi-task natural language processing model having shared layers and task-specific layers. The shared layers can include a lexicon encoder and a transformer encoder. The computer-readable instructions can also cause the hardware processing unit to receive one or more input words, provide the one or more input words to the multi-task natural language processing model, and obtain a task-specific result produced by an individual task-specific layer of the multi-task natural language processing. The computer-readable instructions can also cause the hardware processing unit to use the task-specific result to perform a natural language processing operation.

Another example includes a method or technique that can be performed on a computing device. The method or technique can include evaluating multiple teacher instances of a machine learning model having one or more shared layers, a first task-specific layer that performs a first task, and a second task-specific layer that performs a second task. The method or technique can also include selecting one or more first teacher instances for a first task and one or more second teacher instances for a second task, based at least on the evaluating. The method or technique can also include training a student instance of the machine learning model using first outputs of the one or more first teacher instances to train the first task-specific layer of the student instance and using second outputs of the one or more second teacher instances to train the second task-specific layer of the student instance.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
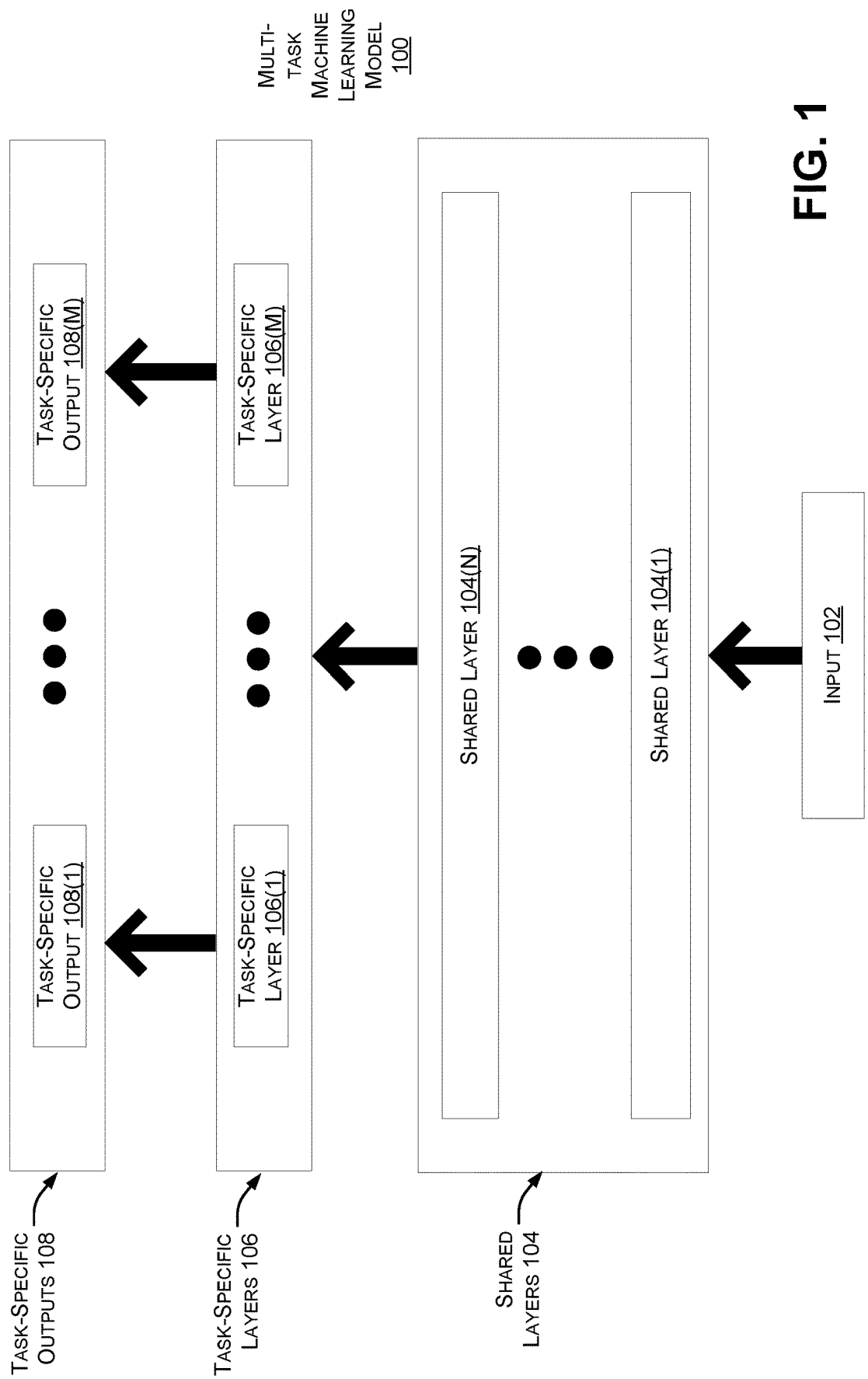
FIGS. 1 and 3-7 illustrate exemplary multi-task machine learning models, consistent with some implementations of the present concepts.

There are various types of machine learning frameworks that can be trained to perform a specific task. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. For the purposes of this document, the term "learned parameters" refers to parameters such as edge weights and bias values that are learned by training a machine learning model, such as a neural network.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The disclosed implementations primarily use neural network structures as example model structures for multi-task machine learning models. The term "trained model" refers to a model structure together with learned parameters for the model structure. Note that two trained models can share the same model structure and yet have different learned parameters, e.g., if the two models trained on different training data or if there are underlying stochastic processes in the training process.

The disclosed implementations provide machine learning models that can perform multiple different tasks, referred to herein as "multi-task" models. For example, as discussed more below, a neural network can have different task-specific layers that perform task-specific operations. The neural network can also have shared layers that are shared by each of the task-specific layers. When the neural network is trained using task-specific data for a given task, the learned parameters of the corresponding task-specific layer can be trained, as well as the learned parameters of the shared layers. Thus, each task-specific layer can learn only on task-specific training data for that task, whereas the shared layers can learn using task-specific data for multiple different tasks.

As discussed more below, this approach has various benefits. Generally, this approach can produce accurate multi-task machine learning models even when there is a limited amount of task-specific training data for individual tasks performed by the model. In addition, this approach can avoid model overfitting, since at least the shared layers are trained for multiple different tasks. In addition, the trained multi-task machine learning model can be readily adapted to new tasks by adding new task-specific layers and perform well even if there is a limited amount of task-specific training data for the new task.

The following discussion introduces some specific examples relating to multi-task neural networks for natural language processing. However, as discussed thereafter, the present concepts can be employed in neural networks that perform other types of tasks, such image processing, audio processing, radar processing, etc. In addition, the following examples introduce model structures that can be varied in many different fashions, as also discussed thereafter.

Example Model

FIG. 1 illustrates an exemplary multi-task machine learning model 100. Multi-task machine learning model 100 is an example of a general framework that can be used to implement different specific types of multi-task machine-learning models, as discussed further below. Multi-task machine learning model 100 can receive an input 102, e.g., a representation of a query, a document, an image, audio, or radar sample, etc. The input can be processed generally via shared layers 104 and task-specific layers 106 to produce task-specific outputs 108. The task-specific outputs can be used for various applications, such search engines, digital assistants, image or audio processing, etc.

The shared layers 104 are shown in FIG. 1 as including N shared layers 104(1) through 104(N). The shared layers process input 102 to produce intermediate outputs (not shown) that are input to the task-specific layers 106. Depending on the specific task being performed, one or more of the M task-specific output layers 106(1) through 106(M) can be invoked to produce a corresponding task-specific output.

Example Method

Figure 2:
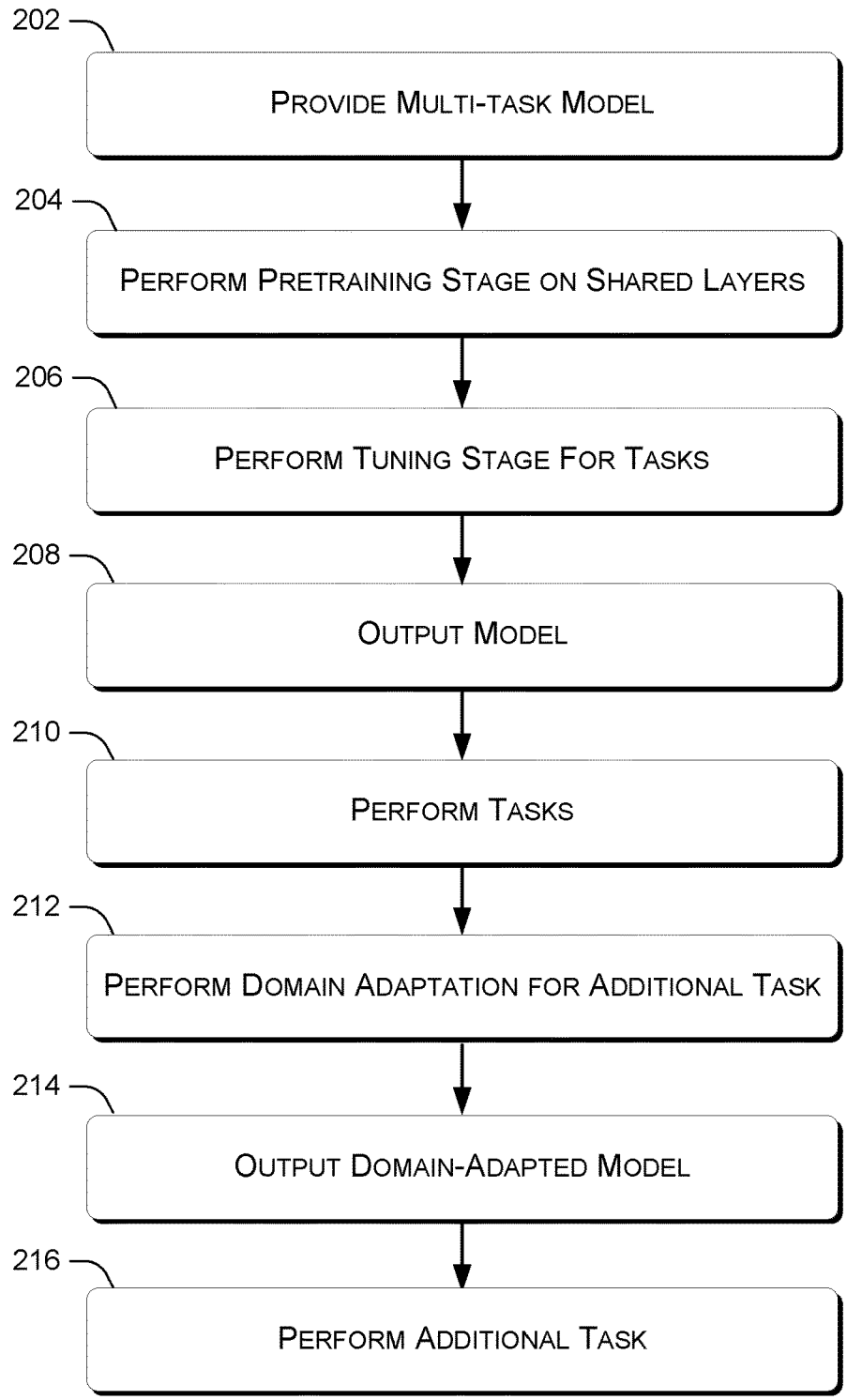
FIGS. 2 and 8 illustrate example methods or techniques for training a multi-task machine learning model, consistent with some implementations of the present concepts.

FIG. 2 illustrates an example method 200 that can be used to train multi-task machine learning model 100, consistent with the present concepts. As discussed more below, method 200 can be implemented on many different types of devices, e.g., by one or more cloud servers, by a client device such as a laptop, tablet, or smartphone, or by combinations of one or more servers, client devices, etc.

Method 200 begins at block 202, where a multi-task machine learning model is provided. For example, the multi-task machine learning model can be a neural network with one or more shared layers and one or more task-specific layers. Block 202 can involve generating an architecture of the multi-task machine learning model manually or using automated techniques to generate the architecture. Alternatively, block 202 can involve receiving a specification of the architecture from a remote device or via user input. The architecture can specify a node structure of each layer of the multi-task machine learning model, connections between nodes and/or layers, types of operations performed by layers, etc.

Method 200 continues at block 204, where a pretraining stage is performed on one or more shared layers of the multi-task machine learning model. In some cases, the pretraining stage can involve an unsupervised learning technique performed using a particular objective, such as predicting the next or previous item in a sequence of data items. In some implementations, blocks 202 and 204 can be combined by receiving a multi-task machine learning model having the one or more shared layers already pretrained. In either case, this can provide initial values for learned parameters of the shared layers.

Method 200 continues at block 206, where a tuning stage is performed on the shared layers and at least two task-specific layers of the multi-task machine learning model. For example, labeled task-specific data can be obtained for each task performed by the task-specific layers. Then, the one or more shared layers and the task-specific layers can be trained together using the labeled task-specific data, as discussed more below.

Method 200 continues at block 208, where the trained multi-task machine learning model is output. For example, the trained multi-task machine learning model can be finalized and deployed when a convergence condition is reached and/or available training data is exhausted. The trained multi-task machine learning model can be deployed locally for execution in the same processing environment where the model is trained (e.g., on a server), or can be exported to another processing environment for execution (e.g., on a client device, a different server, etc.).

Method 200 continues at block 210, where the tasks are performed using the one or more shared layers and the respective task-specific layers. For example, an application can provide input data to the trained multi-task machine learning model. The trained multi-task machine learning model can process the input data to produce a task-specific result using one of the task-specific layers, and the application can use the task-specific result to perform further processing.

Method 200 continues at block 212, where a domain adaptation process is performed for an additional task. To do so, a new task-specific layer for the additional task can be added to the multi-task machine learning model. Next, the new task-specific layer and the shared layers can be trained using additional training data for the additional task.

Method 200 continues at block 214, wherein a domain-adapted multi-task model is output. Block 214 can be similar to block 208, with the exception that the domain-adapted multi-task model has the new task-specific layer and associated learned parameters.

Method 200 continues at block 216, where the additional task is performed using the one or more shared layers and the new task-specific layer. Block 216 can be otherwise similar to block 210. Note that the domain-adapted multi-task machine learning model is still capable of performing any other tasks for which it was trained in block 206.

Specific Multi-Task Machine Learning Model Example

Figure 3:
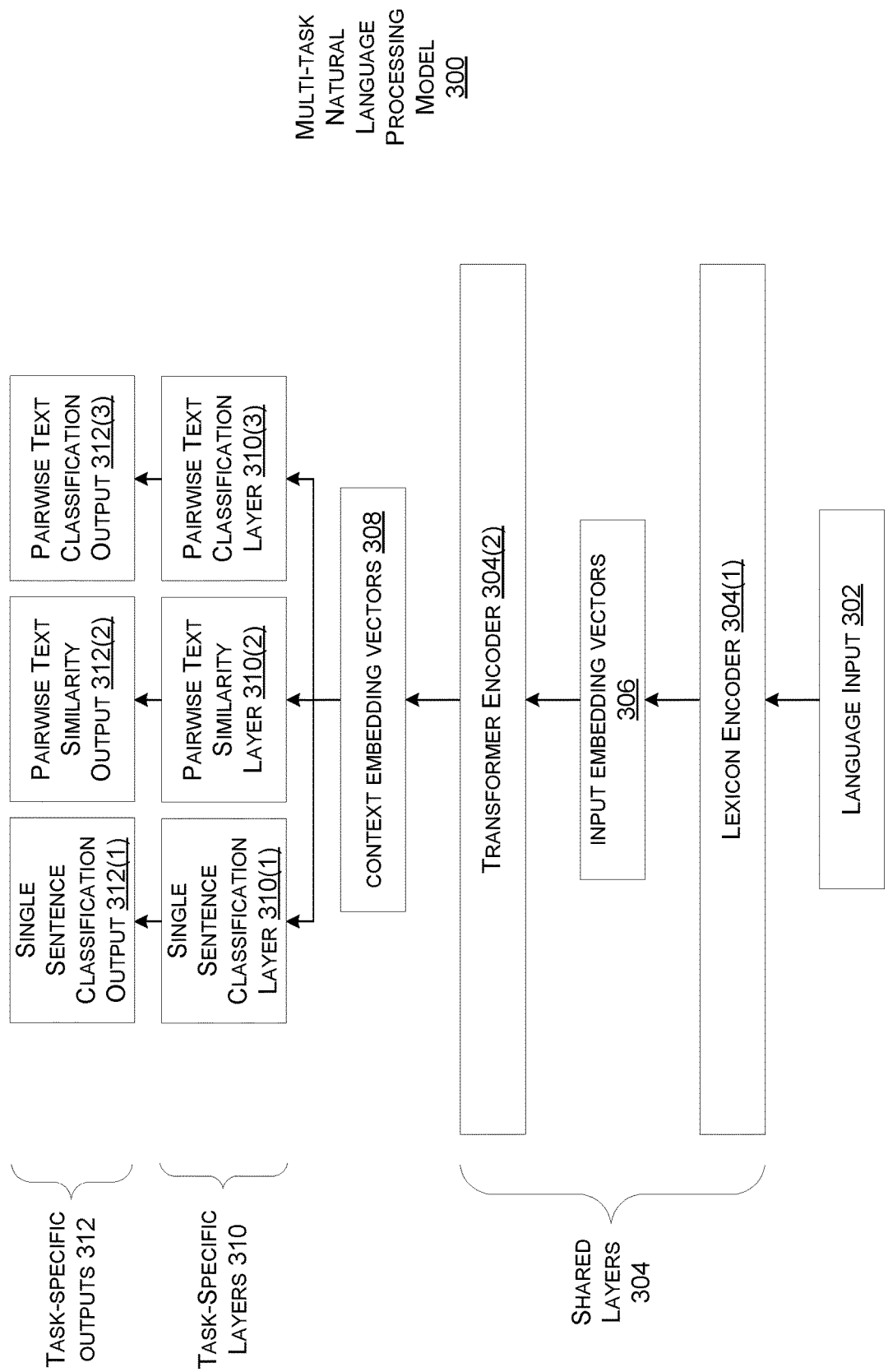

FIG. 3 illustrates an exemplary multi-task natural language processing model 300. Multi-task natural language processing model 300 is a specific type of multi-task machine learning model that can perform different types of natural language processing tasks, as discussed more below. For the purposes of this document, the term "natural language" means language that is normally used by human beings for writing or conversation.

Multi-task natural language processing model 300 can receive language input 302, which can include words, sentences, phrases, or other representations of language. The language inputs can be processed by shared layers 304, which include a lexicon encoder 304(1) and a transformer encoder 304(2). Generally, both the lexicon and transformer encoders operate to produce vectors that represent individual words, sentences, or phrases in a vector space where semantically-similar and/or syntactically-similar words, sentences, or phrases are relatively close to one another, and less semantically-similar or syntactically-similar words, sentences, or phrases are relatively further apart.

Lexicon encoder 304(1) can produce a sequence of input embedding vectors 306 for each word in the language input 302. An input to the lexicon encoder can be sequence of tokens of length m, $X=\{x_1, \ldots, x_m\}$. Specific tokens can be used to delineate the beginning of each sequence, and to separate individual sentences in a given sequence. The lexicon encoder can map X into a sequence of input embedding vectors, one for each token. In some implementations, the input embedding vectors are constructed by summing corresponding word, segment, and positional embeddings for each word.

Transformer encoder 304(2) can obtain contextual information for each word, e.g., via self-attention, and generate a sequence of context embedding vectors 308. Self-attention is a mechanism relating different position of tokens within a sentence to compute the similarities between those tokens. In some implementations, the transformer encoder is a multilayer bidirectional transformer encoder that is configured to map the input embedding vectors 306 into the context embedding vectors. The context embedding vectors can be used as a shared representation of the input phrases or sentences across different tasks. Note that both the lexicon encoder and the transformer encoder can be initialized using unsupervised techniques, and then subsequently updated by tuning using multi-task objectives. The context embedding vectors 308 can be input to each of task-specific layers 310 to perform task-specific processing, as discussed more below.

The task-specific layers 310 can include a single-sentence classification layer 310(1), a pairwise text similarity layer 310(2), and a pairwise text classification layer 310(3). Each task-specific layer can produce a corresponding task-specific output 312, e.g., a single-sentence classification output 312(1), a pairwise text similarity output 312(2), and a pairwise text classification output 312(3).

Specific Algorithms for Implementing Task-Specific Layers

The single-sentence classification layer 310(1) can label a sentence using class labels. As one specific example, the single-sentence classification layer can predict whether an English sentence is grammatically plausible. Another example task is to determine whether the sentiment of a sentence extracted from movie reviews is positive or negative. Note that the single-sentence classification layer can output respective probabilities for each class label c, e.g., via logistic regression with softmax:

$$P_r(c|X) = \text{softmax}(W_{SST}^T x)\qquad\text{Equation 1:}$$

where $W_{SST}$ is a task-specific parameter matrix and X is the input sentence.

The pairwise text similarity layer 310(2) can perform a regression task. Given an input pair of sentences $X_1$ and $X_2$, this layer can output a real-value similarity score indicating the semantic similarity of the two sentences. The similarity score can be computed as:

$$Sim(X_1, X_2) = w_{STS}^T x\qquad\text{Equation 2:}$$

where $sim(X_1, X_2)$ is a real value of the range $[-\infty; \infty]$ and $W_{STS}$ is a task-specific parameter vector.

The pairwise text classification layer 310(3) can determine a relationship between a pair of input sentences based on a set of predefined labels. For example, the labels can indicate whether one input sentence has an entailment relationship, a contradiction relationship, or a neutral relationship with respect to the other input sentence.

One specific implementation of the pairwise text classification layer 310(3) can be given a premise $P=(p_1, \ldots, p_m)$ of m words and a hypothesis $H=(h_1, \ldots, h_n)$ of n words, and trained to find a logical relationship R between P and H. In this case, the pairwise text classification layer can include a stochastic answer network (SAN) that uses multi-step reasoning. Rather than directly predicting the entailment given the input, the SAN can maintain state and iteratively refine predictions as follows.

First, a working memory of premise P can be constructed by concatenating the context embedding vectors 308 of the words in P, which are the output of the transformer encoder 304(2) and denoted below as $M^p \in \mathbb{R}_{d \times m}$. Similarly, the working memory of hypothesis H can be denoted as $M^h \in \mathbb{R}_{d \times n}$. Then, K-step reasoning can be performed on the working memory to output a relation label, where K is a hyperparameter. At the beginning, the initial state $s^0$ is the summary of $$M^h: s^0 = \Sigma_j \alpha_j M_j^h,$$

$$\text{where } \alpha_j = \frac{\exp(w_1^T \cdot M_j^h)}{\Sigma_i \exp(w_1^T \cdot M_i^h)}.$$

At time step k in the range of $\{1, 2, K-1\}$, the state is defined by $s^k = GRU(s^{k-1}, x^k)$. Here, $x^k$ is computed from the previous state $s^{k-1}$ and memory $M^p$: $x^k = \Sigma_j \beta_j M_j^p$ and $\beta_j = \text{softmax}(s^{k-1} W_2^T M^p)$. A one-layer classifier can be used to determine the relation at each step k:

$$P_r^k = \text{softmax}(w_3^T [s^k; x^k; |s^k - x^k|; s^k \cdot x^k])\qquad\text{Equation 3:}$$

Next, utilize all of the K outputs by averaging the scores:

$$P_r = \text{avg}([P_r^0, P_r^1, \ldots, P_r^{K-1}])\qquad\text{Equation 4:}$$

Each $P_r$ can have a probability distribution over all the relations R E R. During training, stochastic prediction dropout can be applied before the above averaging operation. During decoding, outputs of the SAN can be averaged to improve robustness.

Training

In some implementations, one or more of the shared layers can be pretrained by unsupervised learning. In natural language scenarios, unsupervised learning can involve joint conditioning on left and right context of a given token in a token sequence, e.g., the previous or next word in a sentence and/or the next sentence in a document. One approach involves masking tokens and training the one or more shared layers to predict the masked tokens bidirectionally, e.g., left-to-right and right-to-left.

After the shared layers are pretrained, parameters of both the shared layers and the task-specific layers can be tuned using labeled training data. One specific approach is to use a minibatch-based stochastic gradient descent technique to train the learned parameters of the shared and task-specific layers. In each epoch, a mini-batch bt of labeled task-specific data is selected, and the multi-task machine learning model is updated according to the task-specific objective for that task t. This can approximately optimize the sum of the multi-task objectives across the different tasks performed by the multi-task machine learning model. The following is one specific algorithm that can be used to implement this training approach:

---

Algorithm 1: Training a MT-DNN Model

---

Initialize model parameter Θ randomly.
Pre-train the shared layers (i.e., the lexicon)
   encoder and the transformer encoder).
Set the max number of epochs: epoch$_{max}$.
   //Prepare the data for T tasks.
for t in 1, 2, . . . , T do
   Pack the dataset t into mini-batch: $D_t$
end
for epoch in 1,2, . . . , epoch$_{max}$ do
   1. Merge all the datasets:
      $D = D_1 ∪ D_2 . . . ∪ D_T$
   2. Shuffle D
   for $b_t$ in D do
      //$b_t$ is a mini-batch of task t.
      3. Compute loss: L(Θ)
         L(Θ) = Eq. 6 for classification
         L(Θ) = Eq. 7 for regression
         L(Θ) = Eq. 8 for ranking
      4. Compute gradient: ∇(Θ)
      5. Update model: Θ = Θ − ϵ∇(Θ)
   end
end

---

Figure 4:
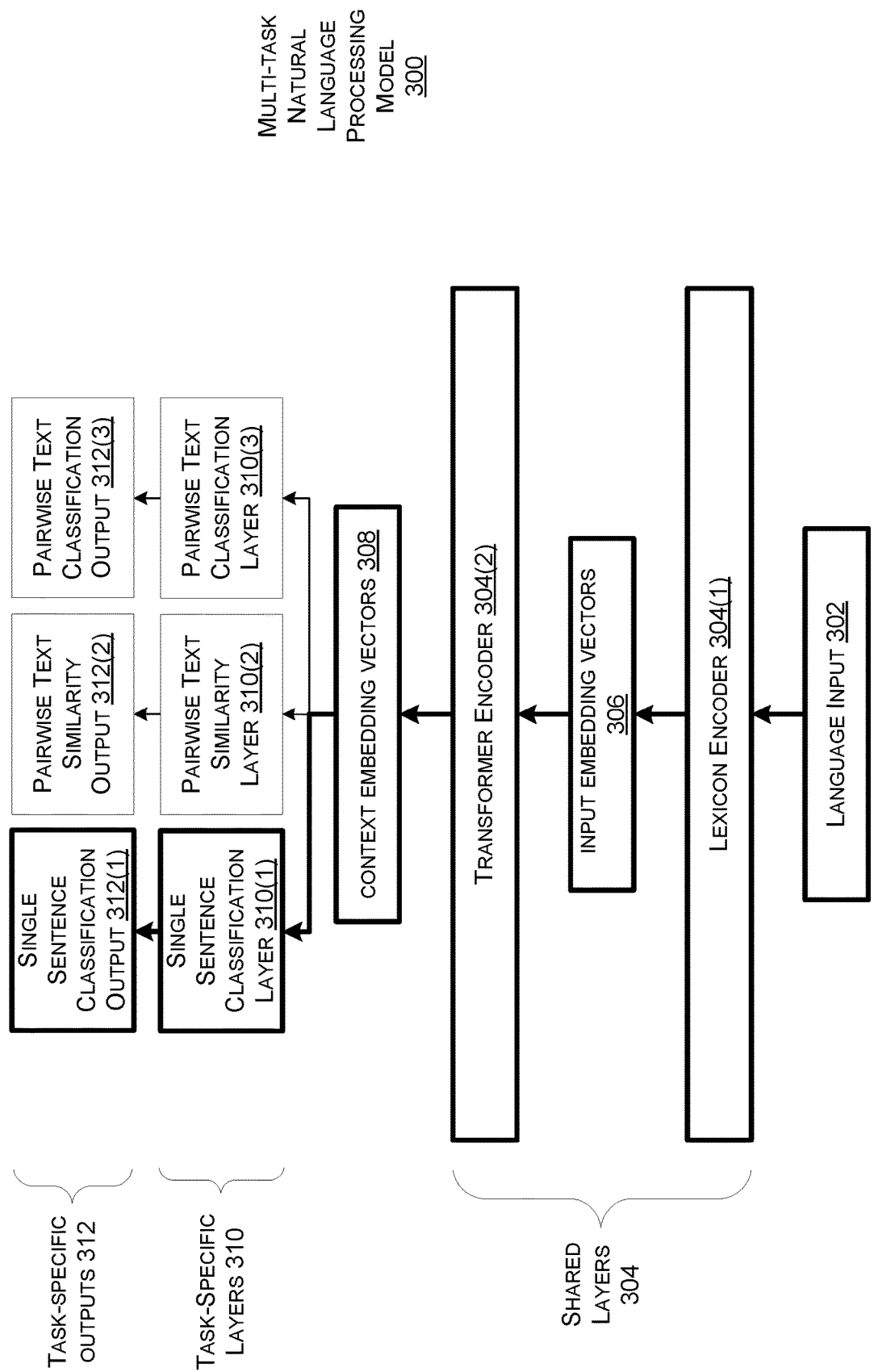
Figure 5:
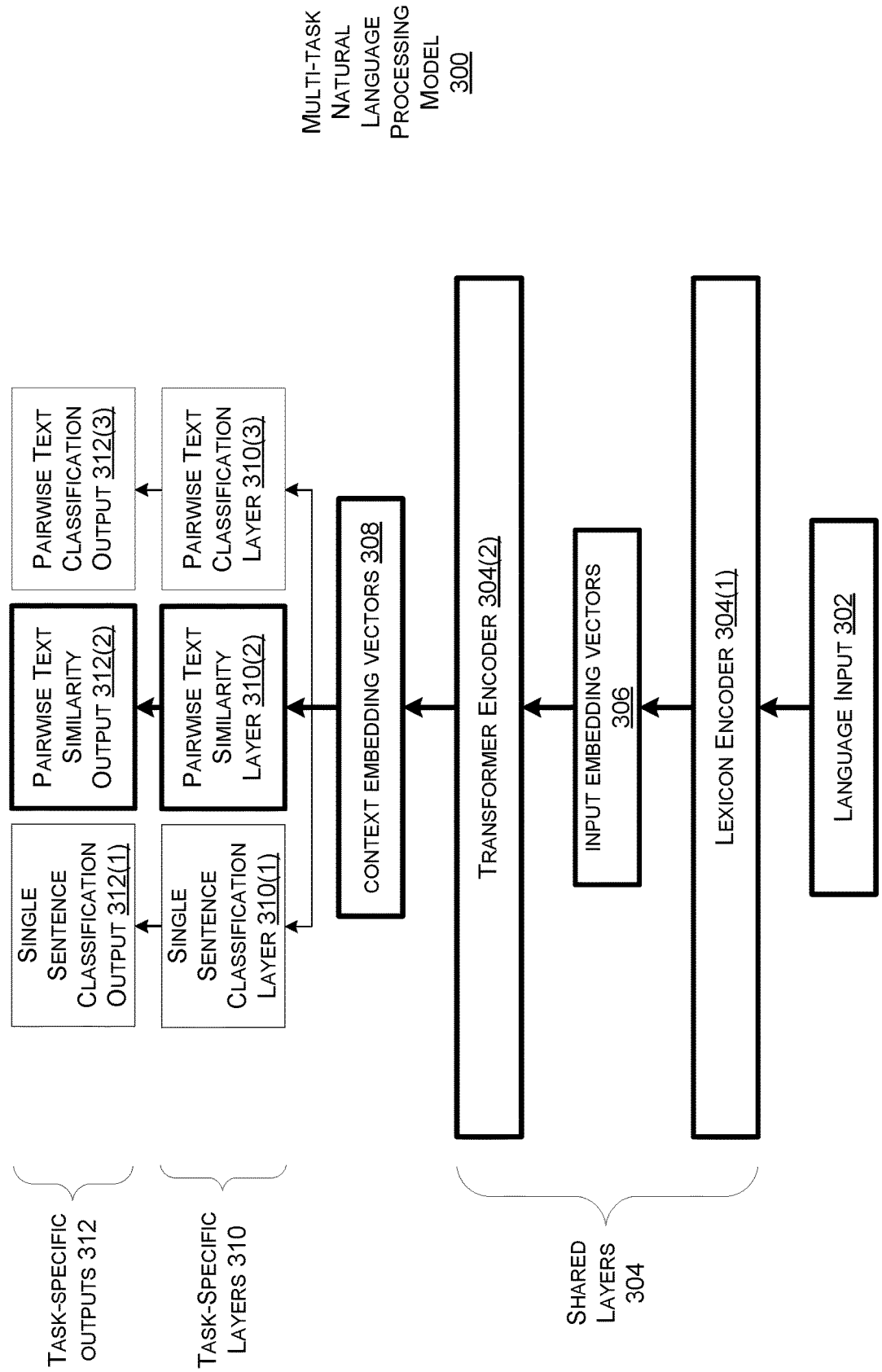
Figure 6:
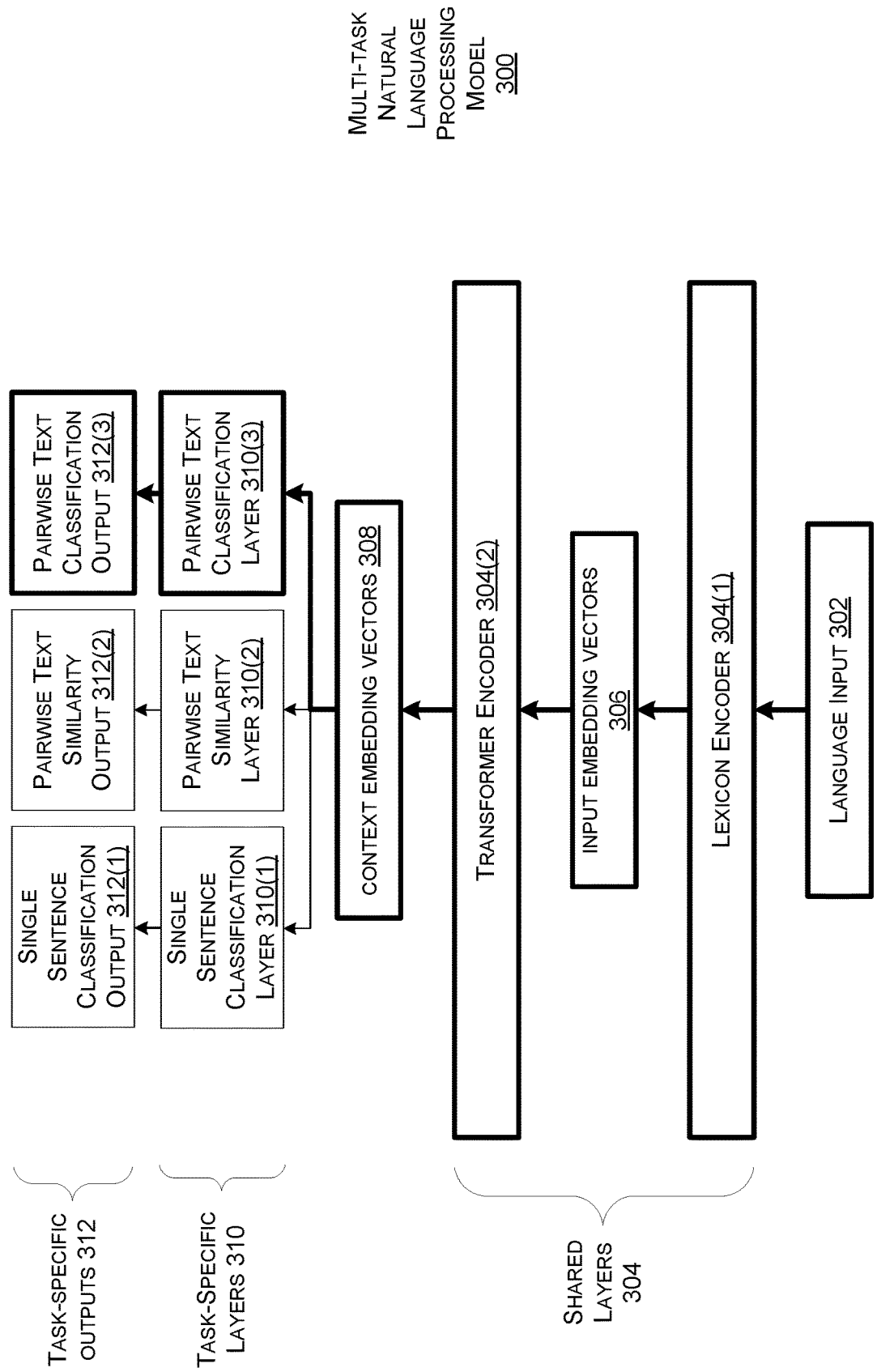

FIG. 4-6 illustrate how different components of multi-task natural language processing model 300 are active during training, depending on which task-specific layer 310 is being trained. Assume there are three labeled sets of training data—a first training data set of single sentences labeled with correct classifications, a second training data set with pairs of sentences labeled to reflect their semantic similarity, and a third training data set with pairs of sentences labeled to reflect entailment, neutral, and/or contradiction relations.

FIG. 4 shows how training can proceed with the first training data set, which can be used to train single-sentence classification layer 310(1). The components of multi-task natural language processing model 300 that are active during training using the first data set are shown in bold in FIG. 4. The first training data set is fed into the shared layers 304, and the context embedding vectors 308 produced from the first training data set are used by single-sentence classification layer 310(1) to produce single-sentence classification output 312(1). Generally, the learned parameters of single-sentence classification layer 312(1), lexicon encoder 304(1), and transformer encoder 304(2) can be updated based on the error in the outputs of the single-sentence classification layer 312(1) relative to the labels for the first training data set. Note that the other task specific layers, pairwise text similarity layer 310(2) and pairwise text classification layer (3), are not updated using the first training data set.

FIG. 5 shows how training can proceed with the second training data set, which can be used to train pairwise text similarity layer 310(2). Again, the components of multi-task natural language processing model 300 that are active during training using the second training data set are shown in bold. The second training data set is fed into the shared layers 304, and the context embedding vectors 308 produced from the second training data set are used by pairwise text similarity layer 310(2) to produce pairwise text similarity layer output 312(2). Generally, the learned parameters of pairwise text similarity layer 312(2), lexicon encoder 304(1), and transformer encoder 304(2) can be updated based on the error in the outputs of the pairwise text similarity layer 312(2) relative to the labels for the second training data set. Note that the other task specific layers, single sentence classification layer 310(1) and pairwise text classification layer (3), are not updated using the second training data set.

FIG. 6 shows how training can proceed with the third training data set, which can be used to train pairwise text classification layer 310(3). Again, the components of multi-task natural language processing model 300 that are active during training using the third training data set are shown in bold. The third training data set is fed into the shared layers 304, and the context embedding vectors 308 produced from the second training data set are used by pairwise text classification layer 310(3) to produce pairwise text classification layer output 312(3). Generally, the learned parameters of pairwise text classification layer 312(3), lexicon encoder 304(1), and transformer encoder 304(2) can be updated based on the error in the outputs of the pairwise text classification layer 312(3) relative to the labels for the third training data set. Note that the other task specific layers, single sentence classification layer 310(1) and pairwise text similarity layer (2), are not updated using the third training data set.

Note that different tasks can use different loss functions as training objectives. For classification tasks (i.e., single-sentence or pairwise text classification), the cross-entropy loss can be used as the objective:

$$-\Sigma_c \mathbb{1}_{(x,c)} \log(P_r(c|X))  \quad\quad\quad \text{Equation 5:}$$

where $\mathbb{1}(X, c)$ is the binary indicator (0 or 1) if class label c is the correct classification for X, and $P_r(•)$ can be defined by Equation 1 above. The parameters of the shared layers and the output layers corresponding to task t can be updated using the gradient computed in Line 4 of Algorithm 1. For text similarity tasks where each sentence pair is annotated with a real valued score y, the mean squared error can be used as the objective:

$$(y - Sim(x_1, x_2))^2 \quad\quad\quad \text{Equation 6:}$$

where Sim(•) is defined by Equation 2 above.

Domain Adaptation

As noted above, once a given multi-task machine learning model is trained using the disclosed techniques, the shared layers tend to generalize well to other tasks that are related to the specific tasks used to train the model. In the case of multi-task natural language processing model 300, the lexicon encoder 304(1) and transformer encoder 304(2) may generalize well for new natural language processing tasks. Thus, it is possible to perform a domain adaptation process on a trained multi-task machine learning model that adds a new task-specific layer for a new task domain to the initial model.

Figure 7:
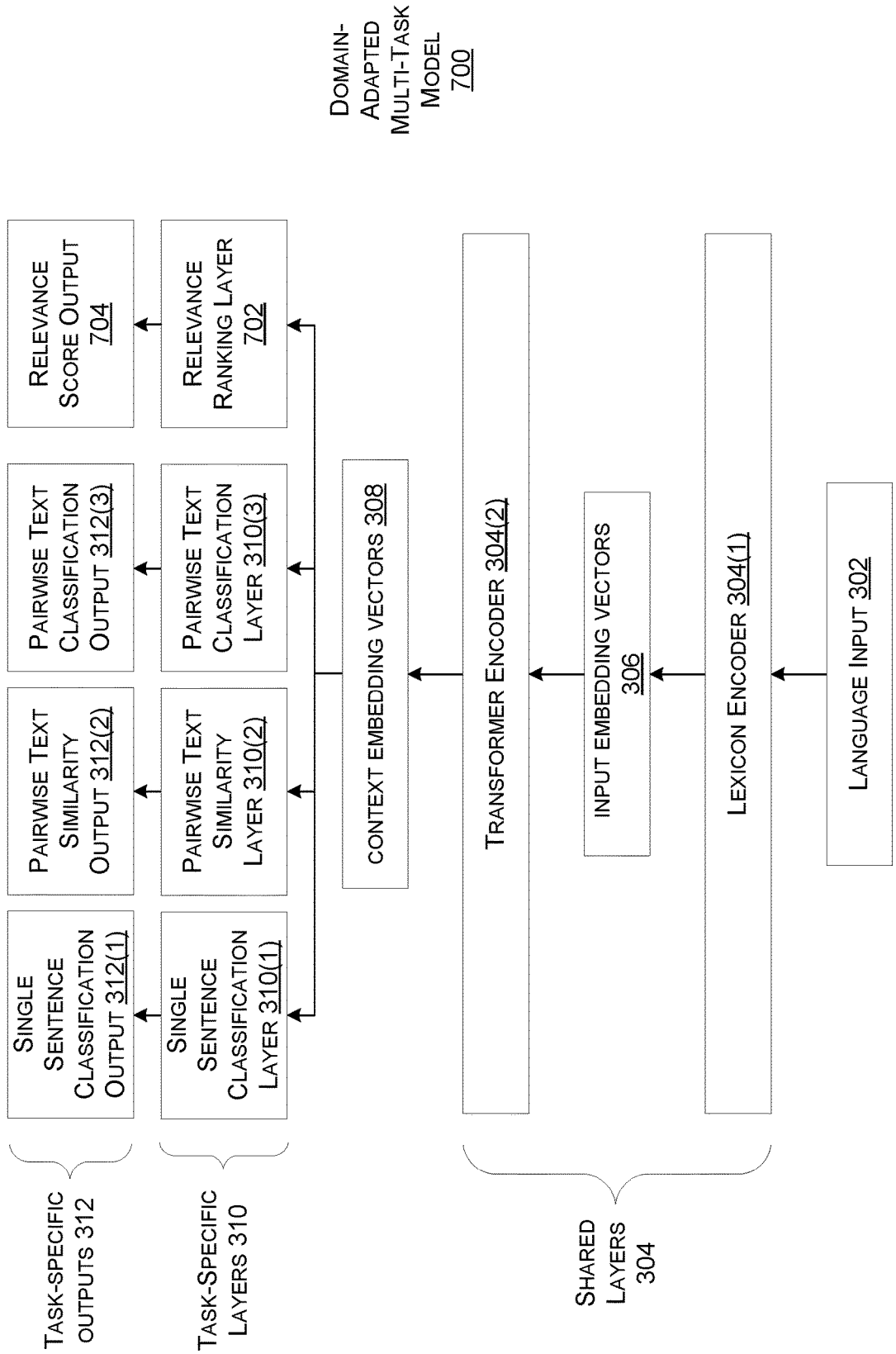

For example, FIG. 7 shows a domain-adapted multi-task model 700 that is similar to multi-task natural language processing model 300, but with the addition of a relevance ranking layer 702 that outputs a relevance score output 704. Generally, the relevance ranking layer can receive two inputs, e.g., a query and a list of candidate answers, and output relevance scores that reflect how relevant each candidate answer is to the query. The relevance scores can be used in a subsequent natural language processing operation to rank the candidate answers in the order of relevance to the query.

One approach to assessing whether a sentence contains the correct answer to a given query can be formulated as a pairwise ranking task. For example, the domain-adapted multi-task model 700 can be expected to compute a relatively higher score for a candidate sentence that contains the correct answer than for another candidate sentence that does not contain the correct answer. For example, the relevance score of a given query Q and answer A can be computed as:

$$Rel(Q,A)=g(w_{QNLI}^T \cdot x)$$  Equation 7:

The candidate sentences can be ranked for the query based on their relevance scores computed using Equation 7.

To train the relevance ranking layer 702, a fourth training dataset can be obtained with sentences that are labeled to indicate whether they contain correct answers to a given query. The training can proceed in a manner similar to that discussed above, e.g., the error in the relevance ranking output 704 relative to the labels can be used to update certain components of the domain-adapted multi-task model 700. For example, the learned parameters of relevance ranking layer 702, lexicon encoder 304(1), and transformer encoder 304(2) can be updated, whereas the learned parameters of single sentence classification layer 310(1), pairwise text similarity 310(2), and pairwise text classification layer 310(3) may remain unmodified.

The objective for relevance ranking tasks can be based on a pairwise learning-to-rank paradigm. For example, given a query Q, obtain a list of candidate answers A which contains a positive example $A^+$ that includes the correct answer, and $|A|-1$ negative examples. Next, minimize the negative log likelihood of the positive example given queries across the training data:

$$\sum_{(Q,A^+)} P_r(A^+ | Q)$$  Equation 8

$$P_r(A^+ | Q) = \frac{\exp(\gamma Rel(Q, A^+))}{\sum_{A' \in A} \exp(\gamma Rel(Q, A'))}$$  Equation 9 where Rel(•) is defined by Equation 7 and y is a tuning factor determined on held-out data.

Characteristics of Multi-Task Training

One potential benefit of the disclosed implementations is to prevent task-specific overfitting. Because the shared layers are trained using loss functions and corresponding training data for different tasks, the shared layers do not become overfitted to any individual task. In addition, by using task data for different tasks to train the shared layers, the shared layers can learn to generate representations that are general in nature—in other words, suited to a broad range of different tasks. For example, input embedding vectors 306 and context embedding vectors 308 can provide representations of words, sentences, phrases, or, more generally, n-grams or other tokens, that can be readily extended to new tasks by the domain adaptation techniques described previously.

Another potential benefit of the disclosed implementations is that a given multi-task machine learning model can be trained to perform well at tasks even when there is not a great deal of task-specific training data. Consider an alternative approach where a single task-specific model is trained entirely on labeled training data for a given task. Further, assume such a task-specific model includes one or more layers that transform input tokens into vector-space representations, such as lexicon encoder 304(1) and transformer encoder 304(2). These layers only receive a training signal from a single task-specific source of training data. This can cause these layers to produce task-specific representations, and there may not be sufficient training data for a single task to adequately train these layers. Note that this is true both for initially training a new model with multiple task-specific layers, as well as for extending an existing model with a new task-specific layer by domain adaptation.

In contrast, the disclosed implementations use multiple tasks to train shared layers to generate representations that can be used for a wide variety of tasks. Because the shared layers benefit from having more training data and produce robust, generalized representations of the input data, the task-specific layers can learn more quickly from the labeled task-specific data that is available for a given task. The result is a multi-task machine learning model that is not only capable of accurately processing input data for a wide variety of tasks, but can be readily extended to new problem domains without building a new model from scratch.

Multi-Task Distillation

In the course of training multi-task machine learning models, some models may tend to perform better than others for a given task. This can be a consequence of training the models on different data sets, using different learning parameters, etc. In some cases, the best-performing multi-task machine learning model that is currently available for a given task can be used for that task, another best-performing model that is currently available can be used for another task, and so on. However, this approach can involve a significant amount of processing, storage, and network resources, because the model structure and learned parameters are repeated over multiple model instances.

Broadly, one approach for saving resources while preserving the benefits of different models involves knowledge distillation. The general idea is to identify certain models that perform well on specific tasks, and then use those models as "teachers" to train a single student model that can be deployed at runtime. Ideally, the student model can approximate the accuracy of the best currently-available teacher models at any given task, without deploying multiple models.

Multi-Task Distillation Method

Figure 8:
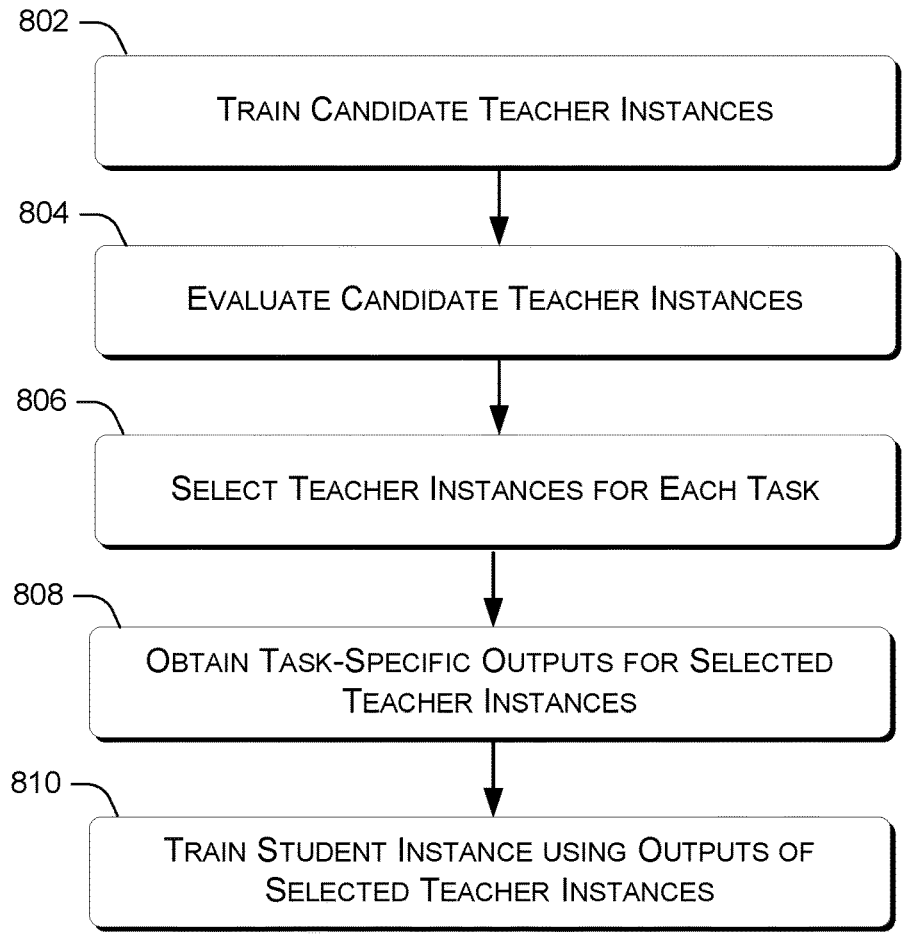

FIG. 8 illustrates an example method 800, consistent with the present concepts. Method 800 can be implemented on many different types of devices, e.g., by one or more cloud servers, by a client device such as a laptop, tablet, or smartphone, or by combinations of one or more servers, client devices, etc.

Method 800 begins at block 802, where candidate teacher instances of a model can be trained. For example, the candidate teacher instances can be different instances of a multi-task machine learning model such as shown above in FIGS. 1 and/or 3.

Method 800 continues at block 804, where the candidate teacher instances can be evaluated. For instance, each candidate teacher instance can be evaluated using held-out labeled test data to determine the accuracy of each candidate teacher instance for each of the individual tasks.

Method 800 continues at block 806, where one or more teacher instances are selected for each task. For instance, the three highest-ranked (e.g., most accurate) candidate teacher instances for a first task can be identified as the selected teacher instances for the first task. Similarly, the three highest-ranked candidate teacher instances for a second task can be identified as the selected teacher instances for the second task, and so on. Note that some candidate teacher instances trained at block 802 may be selected for multiple tasks, and other candidate teacher instances may not be selected for any tasks.

Method 800 continues at block 808, where task-specific outputs are obtained for each of the selected teacher instances. For example, each selected teacher instance for a given task can be used to process additional labeled data for that task. The selected teacher instances can output different values representing assessments of each labeled data instance, e.g., the probabilities of each possible label.

Method 800 continues at block 810, where a student instance of the model is trained using the outputs of the teacher instances. Generally, the student instance can be trained to produce the outputs of the teacher instances for each selected task. In some cases, this can mean that the student instance is trained not only to generate the same final answer as the teacher instances, but to generate an output distribution that is approximately the same as the teacher instances, as discussed more below.

For example, assume that three teacher instances are selected for a first task from a larger group of 100 trained candidate teacher instances. Further, assume that the three teacher instances selected for the first task process a given labeled sentence, and assess that the sentence has a first category with probabilities 0.8, 0.9, and 0.85, respectively, and a second category with probabilities 0.2, 0.1, and 0.15, respectively. Thus, on average, the three selected teacher instances assess that this sentence has the first category with a probability of 0.85 and the second category with a probability of 0.15. The student instance can be trained given an objective to reproduce a probability of the first category with probability of 0.85 and the second category with a probability of 0.15, e.g., to match the average output of the three selected teacher instances for that sentence.

In some instances, the student instance is trained to reproduce the label in the training data as well, e.g., using a loss function that considers both whether the student instance correctly outputs the assigned label as well as how close the output by the student instance matches the output of the selected teacher instances. This approach can be repeated for a second task, a third task, and so on.

Note that a student instance obtained using method 800 can also be used to perform a task as discussed elsewhere herein, e.g., at block 210 of method 200. Generally speaking, method 800 provides similar advantages to ensemble learning without requiring the deployment of multiple models. For example, an alternative approach might be to deploy an ensemble of model instances at runtime, but as noted, this can require significant storage/processing/network resources. By training a single student instance using multiple teacher instances instead, much of the information from the multiple teacher instances can be transferred to the single student instance to obtain similar performance in a much more compact fashion.

Distillation Specifics

A general overview of multi-task distillation learning follows. First, select a few tasks that have available task-specific training datasets w stored in the form of (x,y) pairs, where x is an input and y is its correct "target," or label. For each task, train an ensemble of different multi-task machine learning models as teacher models. Collectively, the ensemble of teacher models can outperform the best currently-available single teacher model. However, the ensemble model is not necessarily feasible for online deployment, as the ensemble model can be very large as it effectively repeats multiple instances of the multi-task machine learning model structure. However, as discussed more below, the ensemble model can be utilized in an offline manner, to produce for each x in the training dataset a set of soft targets.

The term "soft target," as used herein, refers to the raw output of a given task-specific layer, and the term "hard target" refers to a label for a given data item. For example, in a classification task, the soft targets are the class probabilities averaged over the ensemble of different models. Given these values, a single multi-task machine learning model can be trained with the help of the teachers of the ensemble by using both the soft targets and the hard targets across different tasks. This approach can effectively transfer the generalization ability of the teachers to the student.

As discussed above, in a natural language processing context, the output layers can perform functions such as single or pairwise classification, text similarity, relevance ranking, etc. Generally, the knowledge distillation process can involve training these output layers using objective functions defined by the soft targets alone, and/or a combination of the soft targets and the hard targets, i.e., the correct target labels.

Consider text classification as a specific example. A neural network model can output class probabilities using a softmax layer as in Equation 1 above. Let $Q^k$ be the class probabilities produced by the k-th single network of the ensemble. The soft targets can be produced by averaging the class probabilities of all the single networks of the ensemble:

$$Q = \text{avg}([Q^1, Q^2, \ldots, Q^K]). \quad \text{Equation 10:}$$

The student model is trained to approximate the teacher ensemble, which also has a softmax output for the same task $P_r(c|X)$, as in Equation 1. One approach is to use the standard cross entropy loss:

$$-\Sigma_c Q(c|X) \log(P_r(c|X)) \quad \text{Equation 11:}$$

Note that the above loss function differs from the cross-entropy loss in Equation 5 in that the former uses the soft targets $Q(c|X)$ while the latter uses the hard targets via the indicator $1(X,c)$.

The use of the soft targets produced by the teacher instances can be helpful for transferring the generalization ability of the teachers to the student. The relative probabilities of the correct and incorrect answers can indicate how the teacher instances tend to generalize. For example, the sentiment of the sentence "I really enjoyed the conversation with Tom" may only have a very small chance of being classified as negative. But the sentiment of the sentence "Tom and I had an interesting conversation" can be positive or negative, depending on its context if available, leading to a high entropy of the soft targets. In such cases, the soft targets may provide more information per training sample than the hard targets and less variance in the gradient between training samples. By training the student for the soft targets produced by the teacher instances the student can learn to generalize in a similar manner as the teacher instances.

When hard targets are available, the distillation process can also involve training the student model to produce the hard targets, e.g., the correct labels. This can be implemented by defining, for each task, a loss function that averages the cross-entropy loss with the hard targets and the cross entropy with the soft targets. In some implementations, these two loss terms can be weighted differently, e.g., using a scalar multiplier.

Note that some implementations can train a student model using teachers for only a subset of the task-specific layers. For a task t for which teacher instances are available, the task-specific loss can be the average of two objective functions, one for the correct targets and the other for the soft targets assigned by the teacher instances. For other tasks for which teacher instances are not available, the objective function can be defined only for the correct targets.

Using this distillation approach, the student instance can have a much smaller processing and/or storage footprint than the teacher instances. For example, consider a multi-task machine learning model with four task-specific layers, and three different teacher instances for each task. An ensemble approach would involve deploying twelve different teacher models. By using multi-task distillation as discussed herein, a single student model can retain much of the improvement of the ensemble of twelve teacher models. In addition, incorporating knowledge distillation into multi-task machine learning models can even improve the model performance on the tasks where no teacher is used, because the shared layers benefit from the distillation and thus generalize well to other task domains.

Note that the present concepts are not limited to the specific examples set forth above. For example, different objective functions can be defined for using the soft targets and hard correct targets for multi-task learning. In addition, teacher instances might be used to produce the soft targets for large amounts of unlabeled data, which in turn can be used to train a student model in a way conceptually similar to semi-supervised learning. Furthermore, instead of compressing a complicated model to a simpler one, knowledge distilling can also be used to improve the model performance regardless of the model complexity. For example, the distillation approach set forth herein can be used for self-learning, e.g., where the teacher and student instances are the same model instance.

Example Distillation Processing Flow

Figure 9:
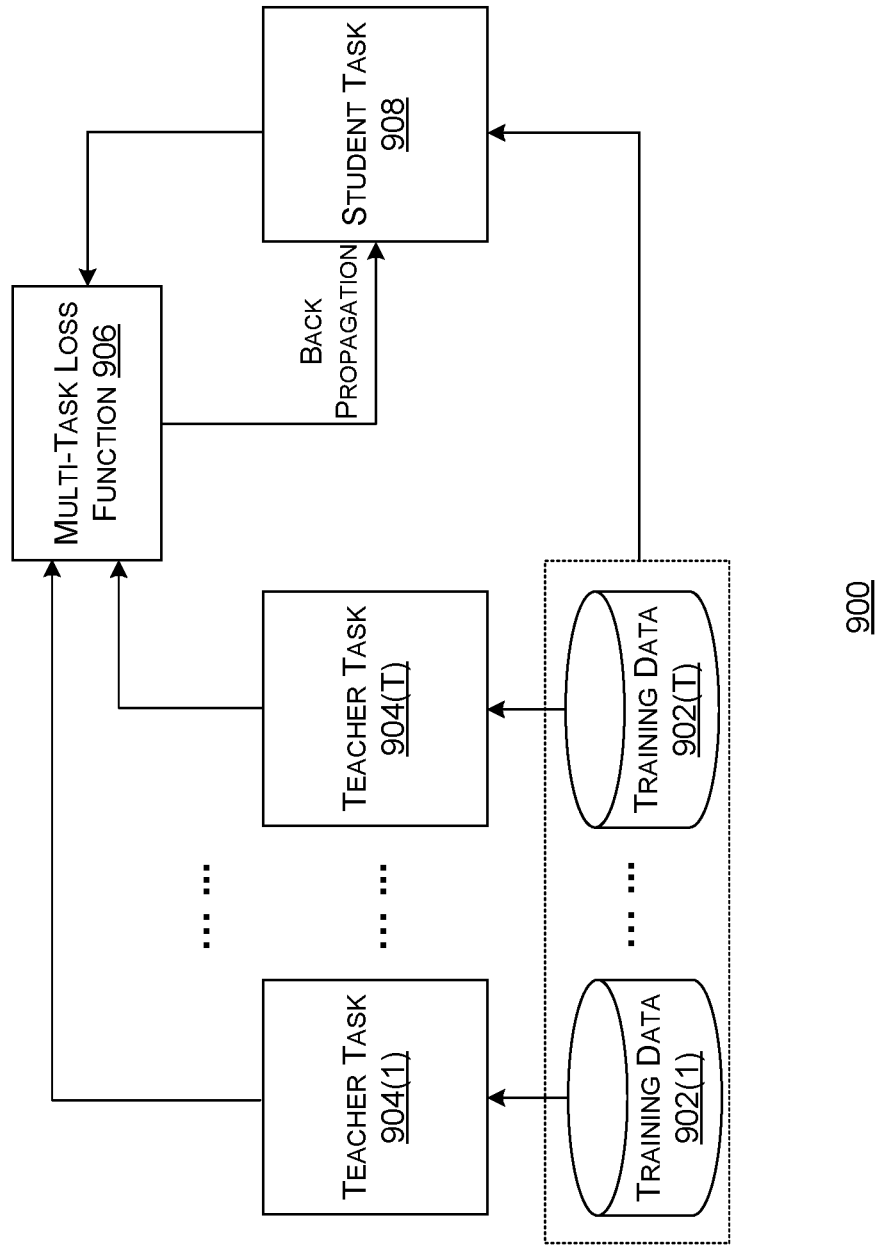
FIG. 9 illustrates an example process flow for training a student instance using multiple teacher tasks, consistent with some implementations of the present concepts.

FIG. 9 illustrates an exemplary processing flow 900 for knowledge distillation. Processing flow 900 begins with training data 902(1) through 902(T), where T is the number of teacher tasks that will be used to train candidate teacher instances. Teacher tasks 904(1) through 904(T) each train one or more teacher model as discussed elsewhere herein, e.g., at blocks 204 and 206 of method 200. A multi-task loss function 906 can be defined based on both the outputs of the individual teacher models (e.g., soft targets) and, in some cases, the labels for the training data (e.g., hard targets).

A student task 908 trains a student model instance using some or all of the training data 902(1) through 902(T) used to train the teacher model instances. The student model task 908 can evaluate the multi-task loss function for each instance of training data and then use the output of the multi-task loss function to update learned parameters of the student model instance, e.g., using back-propagation.

Note that each instance of training data 902 is labeled for a specific task and is used to train a particular task-specific layer as well as one or more shared layers of a given teacher instance. Moreover, each teacher task can train one or more teacher instances, and select a subset of the teacher instances that perform well at a specific task. Thus, for instance, the student task may utilize one or more first teacher instances for training on a first task, one or more second teacher instances for training on a second task, and so on.

Example System

Figure 10:
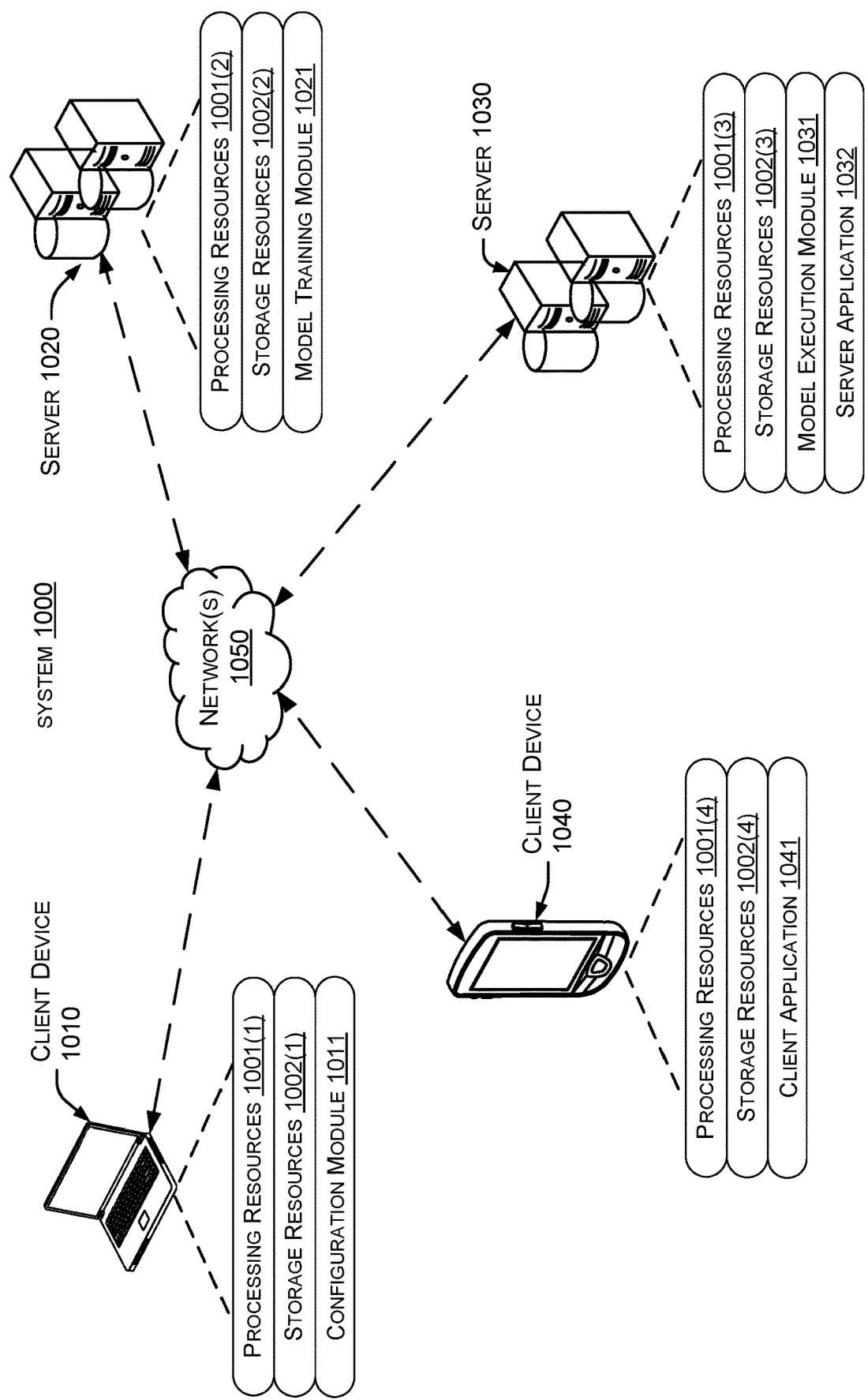
FIG. 10 illustrates an example system, consistent with some implementations of the present concepts.

The present implementations can be performed in various scenarios on various devices. FIG. 10 shows an example system 1000 in which the present implementations can be employed, as discussed more below. As shown in FIG. 10, system 1000 includes a client device 1010, a server 1020, a server 1030, and a client device 1040, connected by one or more network(s) 1050. Note that the client devices can be embodied both as mobile devices such as smart phones or tablets, as well as stationary devices such as desktops. Likewise, the servers can be implemented using various types of computing devices. In some cases, any of the devices shown in FIG. 10, but particularly the servers, can be implemented in data centers, server farms, etc.

Certain components of the devices shown in FIG. 10 may be referred to herein by parenthetical reference numbers. For the purposes of the following description, the parenthetical (1) indicates an occurrence of a given component on client device 1010, (2) indicates an occurrence of a given component on server 1020, (3) indicates an occurrence on server 1030, and (4) indicates an occurrence on client device 1040. Unless identifying a specific instance of a given component, this document will refer generally to the components without the parenthetical.

Generally, the devices 1010, 1020, 1030, and/or 1040 may have respective processing resources 1001 and storage resources 1002, which are discussed in more detail below. The devices may also have various modules that function using the processing and storage resources to perform the techniques discussed herein. For example, client device 1010 can include a configuration module 1011 that can interact with a model training module 1021 on server 1020. Generally speaking, the configuration module can provide certain configuration parameters to the model training module. The configuration parameters can include architecture parameters and training parameters. The architecture parameters can specify the structure of a machine learning model, e.g., the number of nodes, arrangement of the nodes in layers, connectivity of the nodes and/or layers, etc. The architecture parameters can also specify input data and output data for each node and/or layer.

The configuration parameters can also include training parameters that specify information such as learning rates, unsupervised learning parameters and/or data sources, and/or supervised learning parameters and/or data sources. The model training module 1021 uses these training configuration parameters to perform model training functionality on a multi-task machine learning model as specified by the architecture parameters. In particular, the model training module can perform blocks 206 and 212 of method 200, and/or method 800, based on the training configuration parameters. As just one example, the unsupervised learning data sources can include one or more repositories of sentences, where block 206 can involve performing masked token prediction and/or next sentence prediction. As another example, the supervised learning data sources can include task-specific labeled training examples, and/or loss or objective functions for individual tasks.

The model training module 1021 can output a trained, final multi-task machine learning model to server 1030. Model execution module 1031 can execute the final multi-task machine learning model in response to received inputs. For example, server application 1032 can call the model execution module with one or more input data items to be processed by the model. The server application can use the output of the multi-task machine learning model for various purposes, such as classification and/or ranking as discussed elsewhere herein. Client application 1041 on client device 1040 can interact with the server application 1032, e.g., by sending the input data to the server application and receiving and/or displaying results produced by the server application.

Note that system 1000 is exemplary and is provided to illustrate one possible arrangement of functionality on one or more devices. For example, in some cases, the configuration module 1011, model training module 1021, and model execution module 1031 are all provided on the same server or client device. In such cases, an application on the server or client device may execute the model locally. In other cases, the model is trained remotely on a server and then the trained model is executed locally on a client device. In some cases, this is plausible because the distillation techniques discussed herein allow for client-side deployment of a single student model without requiring the deployment of an ensemble of multi-task machine learning models.

Example User Scenarios

Figure 11:
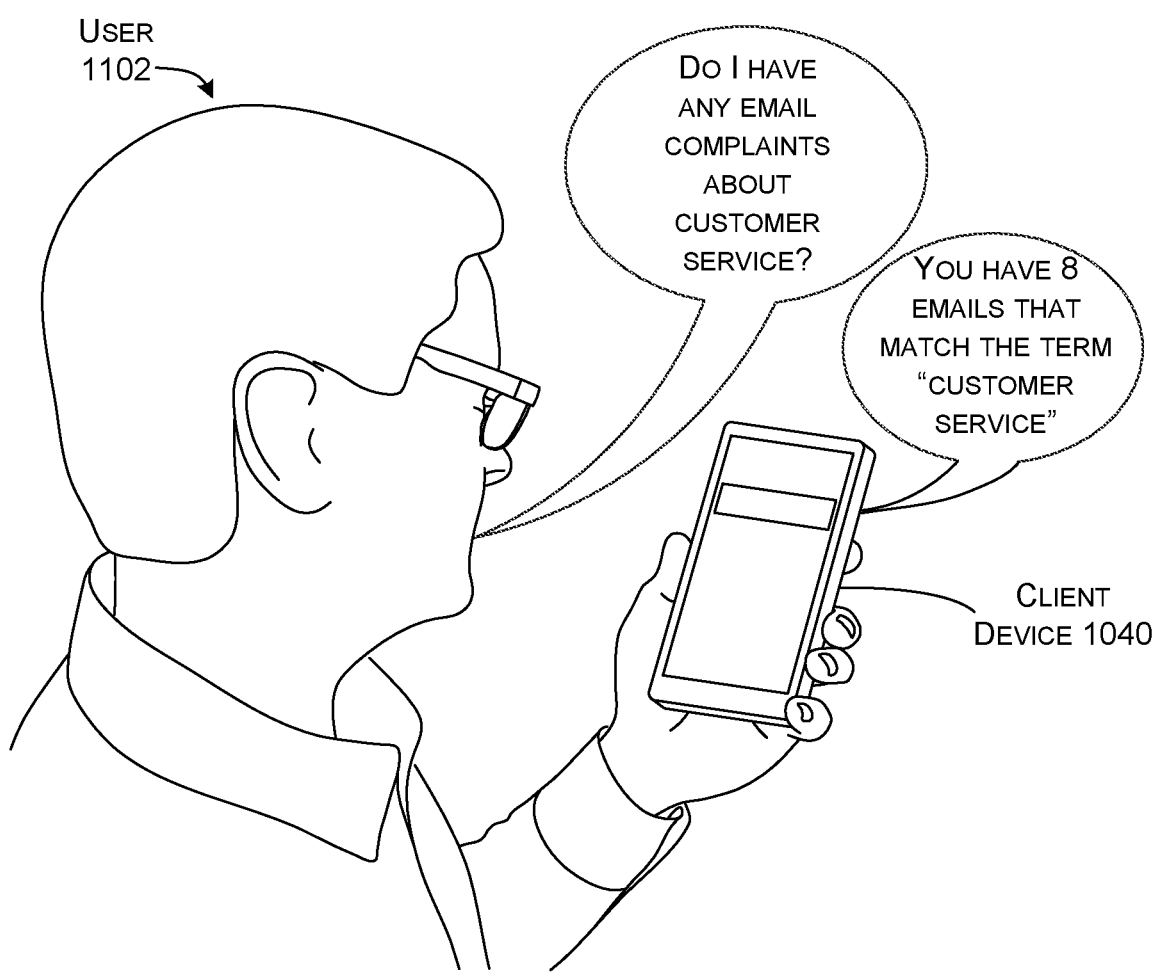
FIGS. 11 and 12 illustrate example multi-task machine learning model deployment scenarios, consistent with some implementations of the present concepts.

FIG. 11 illustrates an example scenario 1100 where a user 1102 interacts with client device 1040. As noted above, the client device can have a local application and/or interact with a server application that can execute a machine learning model such as multi-task natural language processing model 300, as discussed above. In this scenario, the user requests that the application determine whether the user has any email complaints about customer service. The application responds by asking the user if he would like to search his emails for the string "customer service." For example, the application can invoke the pairwise text similarity layer 310(2) to perform a search for similar sentences in the user's email. Because the pairwise text similarity layer is more flexible than a conventional search for the exact string, the application can find related emails that have strings such as "provide service to the customer," or "customers that demand a high level of service."

Figure 12:
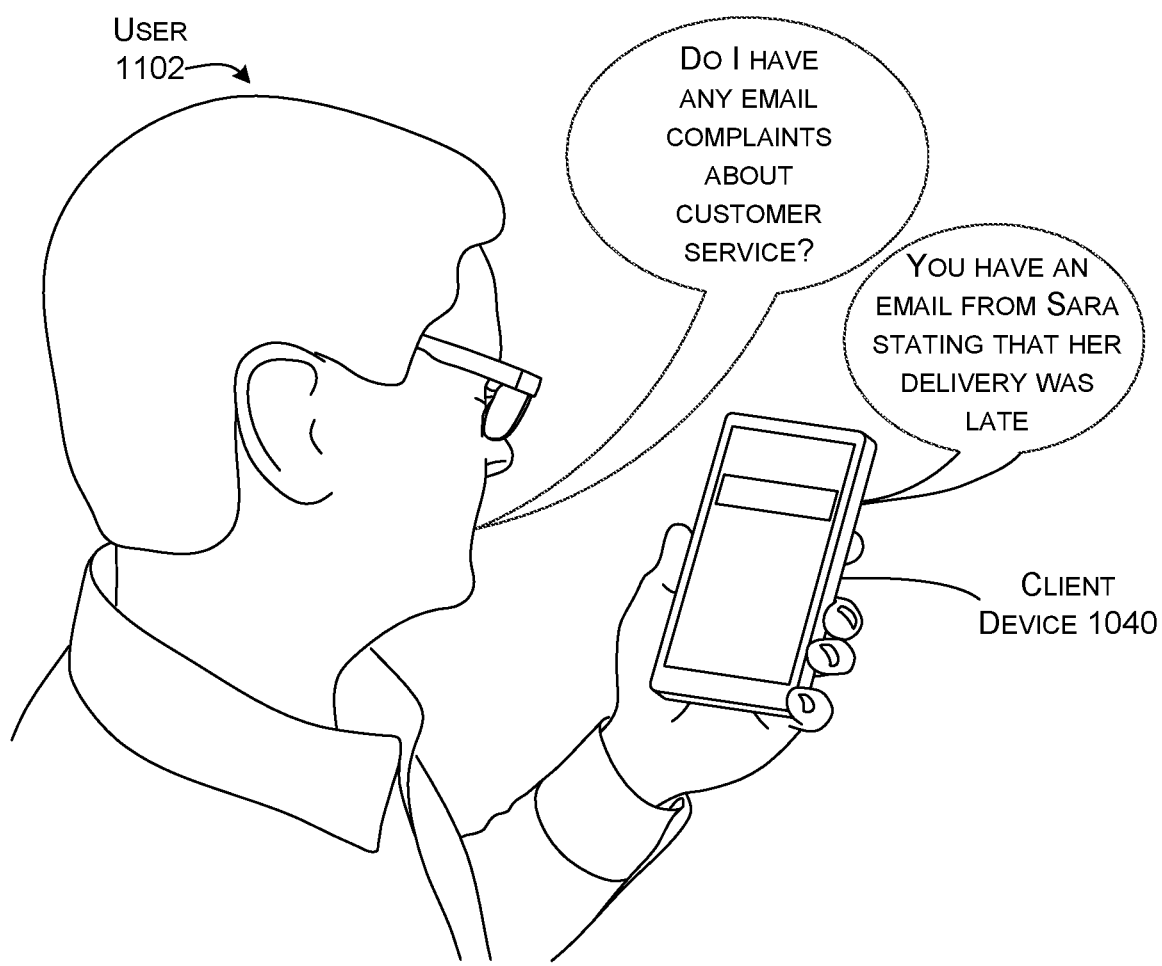

FIG. 12 illustrates an example scenario 1200 where application 1041 has access to domain-adapted multi-task model 700, as shown in FIG. 7. Recall that the domain-adapted multi-task model was domain-adapted to include a relevance ranking layer 702 that can rank the semantic similarity of a query to multiple answers in a semantic space. This allows the application to provide a more flexible search functionality. Here, the user asks for emails about customer service, and the application is able to identify an email from a customer named Sara about a delivery that is late. Here, the email may not include the terms "customer" or "service" or alternative formulations of these terms, and thus may not have been identified by the pairwise text similarity layer 310(2). However, while there may be little textual similarity between Sara's email and these terms, the relevance ranking layer may nevertheless indicate that the query "customer service" is semantically similar to an email complaint about a late delivery. As a consequence, the application is able to identify Sara's email as being responsive to the user's query.

Applications

Generally, multi-task machine learning models such as those disclosed herein can be used to perform various types of tasks. In natural language processing scenarios, multi-task machine learning models can be employed in a search engine, e.g., to rank documents given an input query, to determine the sentiment of a given query, to classify a query as navigational, informational, or transactional, etc. As another example, a multi-task machine learning model can be used in a digital assistant or bot to rank candidate responses to user utterances, to determine whether a user response indicates a positive or negative sentiment for online training purposes of the digital assistant or bot, etc.

More generally, the disclosed implementations can be employed for various types of multi-task machine learning models that use one or more shared layers in conjunction with multiple task-specific layers. In an image processing context, a multi-task machine learning model could have a shared convolutional layer that operates on a window of pixels (e.g., 3×3), one task specific layer that indicates whether certain types of objects are present in a given image, another task-specific layer that semantically labels images, etc. In a radar context, a multi-task machine learning model could have a shared convolutional layer that operates on a window of in-phase and quadrature samples, a task-specific layer that labels ground targets as tracked vs. wheeled vehicles, another task-specific layer that labels air targets as fighter plane vs. transport planes, etc.

Device Implementations

As noted above with respect to FIG. 10, system 1000 includes several devices, including a client device 1010, a server 1020, a server 1030, and a client device 1040. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. In some cases, the modules of system 1000 are provided as executable instructions that are stored on persistent storage devices, loaded into the random-access memory devices, and read from the random-access memory by the processing resources for execution.

As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 1050. Without limitation, network(s) 1050 can include one or more local area networks (LANs), wide area networks (WANs), the Internet, and the like.

In addition, some implementations may employ any of the disclosed techniques in an Internet of Things (IoT) context. In such implementations, a home appliance or automobile might provide computational resources that implement the modules of system 1000.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed on a computing device, the method comprising:
   evaluating a plurality of candidate multi-task teacher instances of a multi-task machine learning model, each candidate multi-task teacher instance having one or more shared layers, a first task-specific layer that performs a first task, and a second task-specific layer that performs a second task;
   based at least on the evaluating, selecting one or more first multi-task teacher instances of the plurality of candidate multi-task teacher instances for the first task and one or more second multi-task teacher instances of the plurality of candidate multi-task teacher instances for the second task; and
   training a multi-task student instance of the multi-task machine learning model, the multi-task student instance having the one or more shared layers, the first task-specific layer, and the second task-specific layer, the training comprising using first outputs of the one or more first multi-task teacher instances to train the first task-specific layer of the multi-task student instance and using second outputs of the one or more second multi-task teacher instances to train the second task-specific layer of the multi-task student instance.

2. The method of claim 1, further comprising:
   training the multi-task student instance using an objective function defined based at least on the first outputs and the second outputs.

3. The method of claim 2, the objective function being further defined based at least on labels associated with labeled data processed to obtain the first outputs and the second outputs.

4. The method of claim 1, wherein the selecting comprises:
   training the plurality of candidate multi-task teacher instances to perform the first task and the second task;
   selecting the one or more first multi-task teacher instances based at least on accuracy of the one or more first multi-task teacher instances at performing the first task; and
   selecting the one or more second multi-task teacher instances based at least on accuracy of the one or more second multi-task teacher instances at performing the second task.

5. The method of claim 4, wherein the training comprises:
   averaging first outputs of multiple first multi-task teacher instances to obtain first averages; and
   training the multi-task student instance to reproduce the first averages.

6. The method of claim 5, wherein the multi-task student instance is trained to reproduce at least two different probabilities for a given category on a given instance of training data.

7. The method of claim 1, wherein the plurality of candidate multi-task teacher instances and the multi-task student instance each include an encoder configured to output context embedding vectors to the first task-specific layer and the second task-specific layer.

8. A system comprising:
   a hardware processing unit; and
   a storage resource storing computer-readable instructions which, when executed by the hardware processing unit, cause the system to:
   access a multi-task student instance, the multi-task student instance being a trained model that has been trained using first outputs of one or more first multi-task teacher instances to train a first task-specific layer of the multi-task student instance and using second outputs of one or more second multi-task teacher instances to train a second task-specific layer of the multi-task student instance;

receive input data;

provide the input data to the multi-task student instance;

obtain a first task-specific result produced by the first task-specific layer of the multi-task student instance; and output the first task-specific result, wherein the multi-task student instance, the one or more first multi-task teacher instances, and the one or more second multi-task teacher instances are instances of a multi-task machine learning model having one or more shared layers, the first task-specific layer, and the second task-specific layer.

9. The system of claim 8, wherein the multi-task student instance is a natural language processing model and the input data comprises input text.

10. The system of claim 9, wherein the one or more shared layers include a lexicon encoder and a transformer encoder that have been trained to map textual tokens into a vector space.

11. The system of claim 10, wherein the input text comprises a sentence and the first task-specific result characterizes a sentiment of the sentence as positive or negative.

12. The system of claim 10, wherein the input text comprises a pair of sentences and the first task-specific result characterizes a semantic similarity of the pair of sentences.

13. The system of claim 10, wherein the input text comprises a pair of sentences and the first task-specific result characterizes the pair of sentences as having an entailment relationship, a contradiction relationship, or a neutral relationship.

14. The system of claim 10, wherein the input text comprises a query and the first task-specific result comprises scores that reflect relevance of a plurality of documents to the query.

15. The system of claim 14, wherein the computer-readable instructions, when executed by the hardware processing unit, cause the system to:

rank individual documents relative to one another based at least on the scores.

16. One or more computer-readable storage media storing instructions which, when executed by one or more hardware processing units, cause the one or more hardware processing units to perform acts comprising:

evaluating a plurality of candidate multi-task teacher instances of a multi-task machine learning model, each candidate multi-task teacher instance having one or more shared layers, a first task-specific layer that performs a first task, and a second task-specific layer that performs a second task;

based at least on the evaluating, selecting one or more first multi-task teacher instances of the plurality of candidate multi-task teacher instances for the first task and one or more second multi-task teacher instances of the plurality of candidate multi-task teacher instances for the second task; and training a multi-task student instance of the multi-task machine learning model, the multi-task student instance being a trained model having the one or more shared layers, the first task-specific layer, and the second task-specific layer, the training comprising using first outputs of the one or more first multi-task teacher instances to train the first task-specific layer of the multi-task student instance and using second outputs of the one or more second multi-task teacher instances to train the second task-specific layer of the multi-task student instance.

17. The one or more computer-readable storage media of claim 16, wherein a pretraining stage has been performed on the one or more shared layers of the one or more first multi-task teacher instances and the one or more second multi-task teacher instances.

18. The one or more computer-readable storage media of claim 17, wherein the one or more shared layers comprise an encoder configured to map natural language tokens into token embeddings in a vector space.

19. The one or more computer-readable storage media of claim 18, wherein a tuning stage has been performed on the first task-specific layer and the second task-specific layer of the one or more first multi-task teacher instances and the first task-specific layer and the second task-specific layer of the one or more second multi-task teacher instances, the tuning stage using different task-specific sets of textual training data to tune the first task-specific layer and the second task-specific layer.

20. The one or more computer-readable storage media of claim 18, the encoder being a transformer encoder.

* * * * *